United States Patent
Candelore et al.

(10) Patent No.: US 12,443,388 B2
(45) Date of Patent: Oct. 14, 2025

(54) AUDIO SKIP BACK RESPONSE TO NOISE INTERFERENCE

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

( * ) Notice: Subject to any disclaimer, the term of this patent is extended or adjusted under 35 U.S.C. 154(b) by 174 days.

(21) Appl. No.: 18/209,365

(22) Filed: Jun. 13, 2023

(65) Prior Publication Data
US 2024/0419389 A1 Dec. 19, 2024

(51) Int. Cl.
*G10L 25/30* (2013.01)
*G06F 3/16* (2006.01)
*G10L 25/78* (2013.01)

(52) U.S. Cl.
CPC .............. *G06F 3/165* (2013.01); *G10L 25/78* (2013.01)

(58) Field of Classification Search
CPC ...... G06F 3/165; G06F 16/685; G06F 17/142; G06F 40/30; G06N 3/08; G06N 3/045; G06N 5/04; G10K 11/17823; G10L 13/00; G10L 15/08; G10L 15/16; G10L 15/22; G10L 17/00; G10L 25/78; G10L 25/81; G10L 25/87; G10L 15/06; G10L 15/063; G10L 15/14; G10L 15/1807; G10L 15/20; G10L 15/26; G10L 17/22; G10L 25/30; G10L 25/93; G11B 27/36; H04J 3/0632; H04N 13/359; H04N 21/47217; H04N 21/8549; H04R 1/1041; H04R 1/406; G06Q 10/10; G06V 40/167; G06V 40/20; H02M 1/08
See application file for complete search history.

(56) References Cited

U.S. PATENT DOCUMENTS

| | | | |
|---|---|---|---|
| 6,885,987 B2 * | 4/2005 | Buchholz | H04J 3/0632 370/476 |
| 9,398,367 B1 | 7/2016 | Scott | |
| 9,584,946 B1 * | 2/2017 | Lyren | H02M 1/08 |
| 9,723,381 B2 | 8/2017 | Swanson | |
| 10,540,957 B2 * | 1/2020 | Hannun | G06N 3/045 |
| 11,082,465 B1 * | 8/2021 | Chavez | G06V 40/20 |
| 11,416,530 B1 * | 8/2022 | Chandrashekar | H04N 21/8549 |
| 11,606,606 B1 * | 3/2023 | Doken | H04N 21/47217 |

(Continued)

FOREIGN PATENT DOCUMENTS

WO WO2023277948 1/2023

*Primary Examiner* — Gerald Gauthier
(74) *Attorney, Agent, or Firm* — Trellis IP Law Group, PC

(57) ABSTRACT

An audio playback system is provided to facilitate adaptive output of audio content, such as spoken word content, by an audio player in response to detecting noise interferences such as external noise outside of the playback system and/or a noise indicator that external noise is about to occur. The playback system utilizes a natural skip back point found in the audio content for playback when audio content is disrupted by external noise. Content features are used to determine the skip back point in the audio content. The audio content is replayed from such a skip back point in a manner that provides a smooth transition to pre-played content and enables a listener to follow the content. Detection of multiple interfering noises within a condensed period of time are addressed to limit redundant and time consuming playbacks.

20 Claims, 7 Drawing Sheets

(56) References Cited

U.S. PATENT DOCUMENTS

| | | | | |
|---|---|---|---|---|
| 11,626,106 B1* | 4/2023 | Ping | | G10L 15/22 |
| | | | | 704/235 |
| 2004/0215457 A1* | 10/2004 | Meyer | | G10L 15/06 |
| | | | | 704/E15.02 |
| 2007/0033032 A1* | 2/2007 | Schubert | | G10L 15/1807 |
| | | | | 704/E15.04 |
| 2007/0124142 A1* | 5/2007 | Mukherjee | | G10L 15/26 |
| | | | | 704/235 |
| 2008/0089530 A1 | 4/2008 | Bostick | | |
| 2008/0319750 A1* | 12/2008 | Potter | | G10L 15/26 |
| | | | | 704/E15.045 |
| 2014/0092212 A1* | 4/2014 | Ito | | H04N 13/359 |
| | | | | 348/43 |
| 2015/0100310 A1* | 4/2015 | Cha | | G10K 11/17823 |
| | | | | 324/318 |
| 2015/0235637 A1* | 8/2015 | Casado | | G10L 15/20 |
| | | | | 704/235 |
| 2016/0232891 A1* | 8/2016 | Pecorari | | G10L 15/063 |
| 2018/0032305 A1* | 2/2018 | Cameron | | G06F 40/30 |
| 2018/0032611 A1* | 2/2018 | Cameron | | G06F 16/685 |
| 2018/0091913 A1* | 3/2018 | Hartung | | G10L 15/22 |
| 2018/0233141 A1* | 8/2018 | Solomon | | G06V 40/167 |
| 2018/0260680 A1* | 9/2018 | Finkelstein | | G06N 5/04 |
| 2018/0352390 A1* | 12/2018 | Koul | | G10L 15/08 |
| 2018/0374470 A1 | 12/2018 | Sarkar | | |
| 2018/0374486 A1* | 12/2018 | Zhao | | G10L 17/22 |
| 2020/0125317 A1* | 4/2020 | Sabin | | H04R 1/406 |
| 2020/0193987 A1* | 6/2020 | Minkin | | G10L 25/30 |
| 2020/0335091 A1* | 10/2020 | Chang | | G10L 15/14 |
| 2020/0351550 A1 | 11/2020 | Korupolu | | |
| 2021/0304736 A1* | 9/2021 | Kothari | | G06N 3/08 |
| 2021/0358483 A1* | 11/2021 | Chao | | G10L 17/00 |
| 2021/0375306 A1* | 12/2021 | Li | | G06F 17/142 |
| 2022/0070593 A1* | 3/2022 | Riemer | | G10L 17/00 |
| 2022/0141527 A1* | 5/2022 | Channapragada | | G11B 27/36 |
| | | | | 725/18 |
| 2022/0246168 A1* | 8/2022 | Marti | | G10L 25/78 |
| 2022/0351740 A1* | 11/2022 | Aher | | G06Q 10/10 |
| 2023/0005495 A1* | 1/2023 | Kukde | | G10L 25/93 |
| 2023/0107493 A1* | 4/2023 | Bijwadia | | G10L 15/16 |
| | | | | 704/270 |
| 2024/0419389 A1* | 12/2024 | Candelore | | G10L 25/87 |
| 2024/0419390 A1* | 12/2024 | Candelore | | H04R 1/1041 |

* cited by examiner

300

320a — Person 1: Today we have John X, who is author of the children's book, "A Dinosaur." ʌ Welcome to my podcast, John X. ʌ What inspired you to write this book? ↘302a 302b —ʌ

⌐304
320b — Person 2: My kids love dinosaurs. ≙ So, I wanted to write a story that they would want to read. ↘306a
ʌ

Person 1: Would you tell us what you enjoy doing in your spare time?
ʌ

⌐304  ⌐306a
Person 2: I am an avid fly fisher. ≙ In order to do that, I do lots of hiking to good fishing spots. ʌ Another of my hobbies is cooking Italian food.
ʌ

⌐308
Person 1: Let's pause here to listen to a clip of a reading of the book, "A Dinosaur." ʌ
↘302c

FIG. 3

AUDIO SKIP BACK RESPONSE TO NOISE INTERFERENCE

CROSS REFERENCES TO RELATED APPLICATIONS

This application is related to the following applications which are hereby incorporated by reference as if set forth in full in this application for all purposes: U.S. patent application Ser. No. 18/209,382, entitled NOISE DETECTION FOR SKIP BACK OF AUDIO (020699-123700US), filed on Jun. 13, 2023; and U.S. patent application Ser. No. 18/209,376, entitled RESPONSIVE NOISE CANCELATION OVERRIDE (20699-123400US), filed on Jun. 13, 2023.

BACKGROUND

Audio players include a variety of devices to provide audio content, including spoken word audio. With the advent of portable audio players, listeners are free to multitask by consuming audio content, while performing other activities, such as walking, exercising, driving, riding, and the like. Some audio players communicate with personal listening devices, for example, headphones, earbuds, and hearing aids that direct audio to the ear of a listener.

At times, environmental noises may compete with outputted audio content, making it difficult for a listener to hear and/or understand the audio content. Unlike listening to music, when spoken word audio content such as podcasts, audiobooks, audio dramas, etc., is missed, there can be a loss of contextual meaning.

SUMMARY

The present audio playback system (also called "playback system") enables adaptive output of audio content by an audio player in response to detected noise interferences, such as triggering external noise outside of the playback system and/or an indication that triggering external noise is about to occur. When audio content is disrupted by external noise, the playback system searches for a natural target place in the audio content from which the audio can be replayed. The audio content is replayed from such a skip back point in a manner that provides a smooth transition to pre-played content and enables a listener to follow the content.

A computer-implemented method is provided as performed by the present playback system. The method includes outputting spoken word content at a beginning point by an audio player to a listener during a listening session. During the listening session, a first interfering noise is detected while an interfered portion of the spoken word content is outputted. A first skip back point is determined in the outputted spoken word content based, at least in part, on one or more content features. The first skip back point defines a first playback portion of the spoken word content after the beginning point, including the interfered portion and an additional portion of the spoken word content that is previously played. The first playback portion is outputted during the listening session.

In some aspects of certain implementations of the method, the first skip back point is determined by analyzing speech data of the spoken word content to detect the one or more content features. For example, the one or more content features can include switching between one or more characters speaking, a pause in speaking of one or more characters, etc.

In some implementations, the spoken word content may be recorded content. The first skip back point may be determined by a content artificial intelligence (AI) model trained to recognize the one or more content features.

The method can also include pausing of the outputting of the spoken word content during the listening session while the first interfering noise is present, prior to playing back the spoken word content. The method may further comprising outputting a natural language notification of a playback mode of the audio player prior to outputting the first playback portion.

In some implementations, one or more subsequent interfering noises may be detected within a particular period after detecting the first interfering noise. In such cases, steps may be taken for each of the subsequent interfering noise detected. The steps may include determining a potential additional skip back point associated with each of the detected one or more subsequent interfering noises, in a same manner as determining the first skip back point. The steps may further include comparing locations of each of the potential additional skip back points in the spoken word content to a farthest allowable point in the spoken word content. Upon determining that the potential additional skip back point is prior to the farthest allowable point, the spoken word content may be outputted from the farthest allowable point. Upon determining that the potential additional skip back point is after the farthest allowable point, the spoken word content may be outputted from the potential additional skip back point.

Further in response to detecting each of the one or more subsequent interfering noise, it may be determined whether a maximum number of skip back events is met. The steps of determining each potential second skip back point and the comparing the locations to the farthest allowable point may be performed in response to determining the maximum number of skip back events is not been met.

In some implementations, an apparatus of an audio playback system is provided, which is configured for responsive playback of spoken word content. The apparatus includes one or more processors and logic encoded in one or more non-transitory media for execution by the one or more processors and when executed operable to perform various operations as described above in terms of the method.

In some implementations, a non-transitory computer-readable storage medium is provided which carries program instructions for responsive playback of spoken word content. These instructions when executed by one or more processors cause the one or more processors to perform operations as described above in terms of the method.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

FIG. 3 is an illustration of an example of speech data including identified content features of spoken work content, in accordance with some implementations.

DETAILED DESCRIPTION OF EMBODIMENTS

Figure 1:
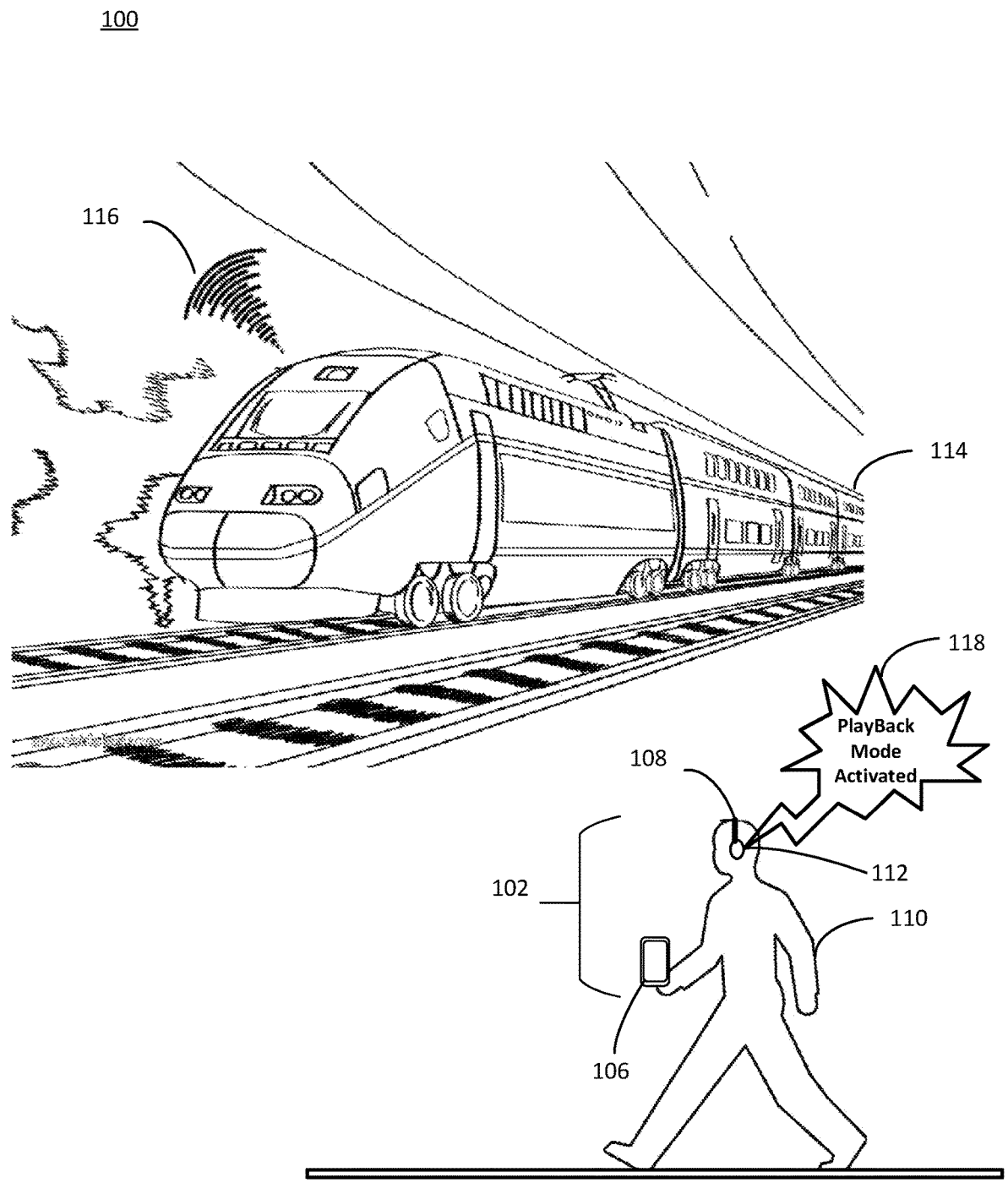
FIG. 1 is a conceptual diagram illustrating an example setting in which various aspects of an audio playback system can be implemented, in accordance with some implementations.

The present audio playback system enables a listener to consume audio content without concern that interfering noises from the environment hinders enjoyment of the content. The playback system adapts the output of the audio content to replay portions of the audio when external noise conflicts with the listening of the audio content. For example, a skip back point in the audio content is determined and content is replayed from the skip back point.

The skip back point is a place in the audio content after the beginning point from which the audio content was initially played during a listening session. In some implementations, the skip back point is a natural place in the audio content that, based on characteristic feature of the content, allow for a smooth transition for the listener. For example, the skip back point may be an identified change between characters speaking or a pause in a character's speech. In some implementations, after the interfered portion of the audio content is replayed, the playback system seamlessly continues to output previously un-played portions of the audio content from the point that the audio was paused due to the interfering noise.

One or more content features of the audio content may be determined by the playback system. The content features may be used by the playback system to find a natural skip back point in the audio content that enables a smooth transition to played back content. Typically, the content features are characteristics of the content that identify distinguished aspects particular to the content. Content features are distinct for different audio content. For example, content features may include the switch of speaking parts from a character to another character, a pause in speech by a character, a change in tone or mood, such as signified by a voice inflection of a character's speech. In some implementations, the playback system may analyze speech data such as waveforms and/or spectrograms of the spoken word audio content to detect content features.

In some implementations, an AI model may be employed to recognize content features of the audio content. The AI model may be trained on a recording of the audio content.

At times, additional interfering noises may be detected shortly after playback is initiated. In some implementations, the playback system may respond to the additional external noise by employing a repetitive playback procedure. For example, the playback system may designate a farthest skip back point in the audio content and restrict playback beyond the farthest skip back point in response to multiple noise interferences. In some implementations, the repetitive playback procedure may use a maximum number of skip backs, such as 2-5 skip backs, to cap the skip back events responded to by the playback system within a period of time, such as a maximum number of skip backs during a listening session or within a segment of the listening session. In this manner, the playback system may avoid having the listener to rehear an interfered portion of audio content multiple times or consume too much time by replaying the audio content multiple times. An interfered portion of the content refers to content that is outputted but not heard correctly, missed, or misunderstood due to presence of the external noise.

At times, the system may playback a portion of the content due to anticipated noise interruptions. In such cases, the listener may not have missed the content because the content is paused before the noise starts. The playback system uses a skip back point to smooth the transition to playing the content for the listener.

A "listener" (also referred to as a "user") as applied in this description, refers to one or more users that consume audio content outputted by the playback system. The listener may listen to the audio outputted via a personal listening device (such as headphones or earbuds) or directly from an audio player.

Personal listening devices (also referred to as "portable listening devices" or "directed listening devices") direct audio to the ears of the listener. Such devices can include headphones, earbuds, over-the-counter hearing aids, hearables, headsets, bone conduction wearables, sound beaming technology to focus audio through a space to ears of a listener, other advancements in personal listening devices including future technologies, and so on. Directed listening devices often pair with audio players, including audio playing software, that provide a source of the audio content. For example, some hearing aids can connect with a smartphone, tablet, or computer for the user to listen to audio content. However, some directed listening devices can also include an integrated audio source without communicating with a separate audio player. In general, personal listening devices can allow for screen-free playing of audio content.

Although personal listening devices are described, it should be understood that the audio playback system may also be applied to other listening devices, such as audio players coupled to or integrated with various electronic devices including multi-purposes electronic devices, such as a smartphone, computer, vehicle, home smart speakers, am/fm receiver, television audio channel, internet connected device, etc.

For the purposes of the present discussion, spoken word audio content (also referred to as "spoken word content" or "spoken word audio") may be any content in which speaking is the main or only focus of the content. Examples of spoken word audio includes podcasts, audiobooks, audio dramas, sermons, poetry, narration, storytelling, instructional recordings, and so on. Spoken word audio may be presented with or without music accompaniment but differs from music in that speech is a main focus in spoken word content. When spoken word is joined with music accompaniment, the spoken word content differs from lyrics of a song in that speech provides the main instrument and focus of the content, such as expressing text, telling a story, or a stream of consciousness. Content-based skip back points may not be as useful in music content because of repetition in the music and/or lyrics. However, aspects of the audio playback system may also be applied to music and other forms of audio content that can be outputted via a listening device.

A character, as used by this description, may be one or more persons providing spoken language in the audio content. In some audio content, one person may portray multiple (two or more) characters in the audio content.

The audio playback system is beneficial for a listener of audio content, such as spoken word content to avoid missing content or mishearing the content. When an external noise interferes with the listener's enjoyment of the content, increasing the volume of the audio content above the external noise can be detrimental to the listener. It can also be burdensome for the listener to manually pause the audio content while exposed to an interfering noise and/or replay missed content. A listener may also manually attempt to find and replay a missed portion. But manual replaying of the content takes time and attention away from other tasks the listener may be involved with while listening to the audio content.

Other systems may replay audio content from the beginning of the content or rewind to the missed portion of the content. Restarting the content forces the listener to hear the entire content again. A portion of the audio content that gets played back is important for the listener to make sense of the audio being repeated. For example, if the skip back is a point in the middle of a spoken sentence, the audio content may be confusing to the listener.

The present playback system addresses these problems with other systems and have additional benefits.

FIG. 1 is an illustration of an environment 100 in which an audio playback system 102 may be used to respond to interfering external noise 116 by a local train 114. The audio playback system 102 includes an audio player 104. In the example of FIG. 1, the audio player 104 may be a smart phone, which may be in communication with headphones 108 as a personal listening device on a listener 110. A microphone 112 coupled to the headphones 108 detects noise 116 emanating from the train 114. The audio player determines that the noise 116 is an interfering noise that is disruptive to the audio content being played. In some implementations, the microphone 112 may be coupled to the audio player 104 in addition to or instead of being coupled to the headphones 108.

Upon determination of the interfering noise, the playback system 102 initiates a skip back mode. In some implementations, the playback system 102 provides an audible notification 118 that the playback mode is activated. For example, the audio content may be paused and in natural language one or more words, phrases, statements, etc. may be outputted to indicate a skip back mode, such as "playback mode activated." The playback system may be employed in a wide variety of other contexts and use cases.

Figure 2:
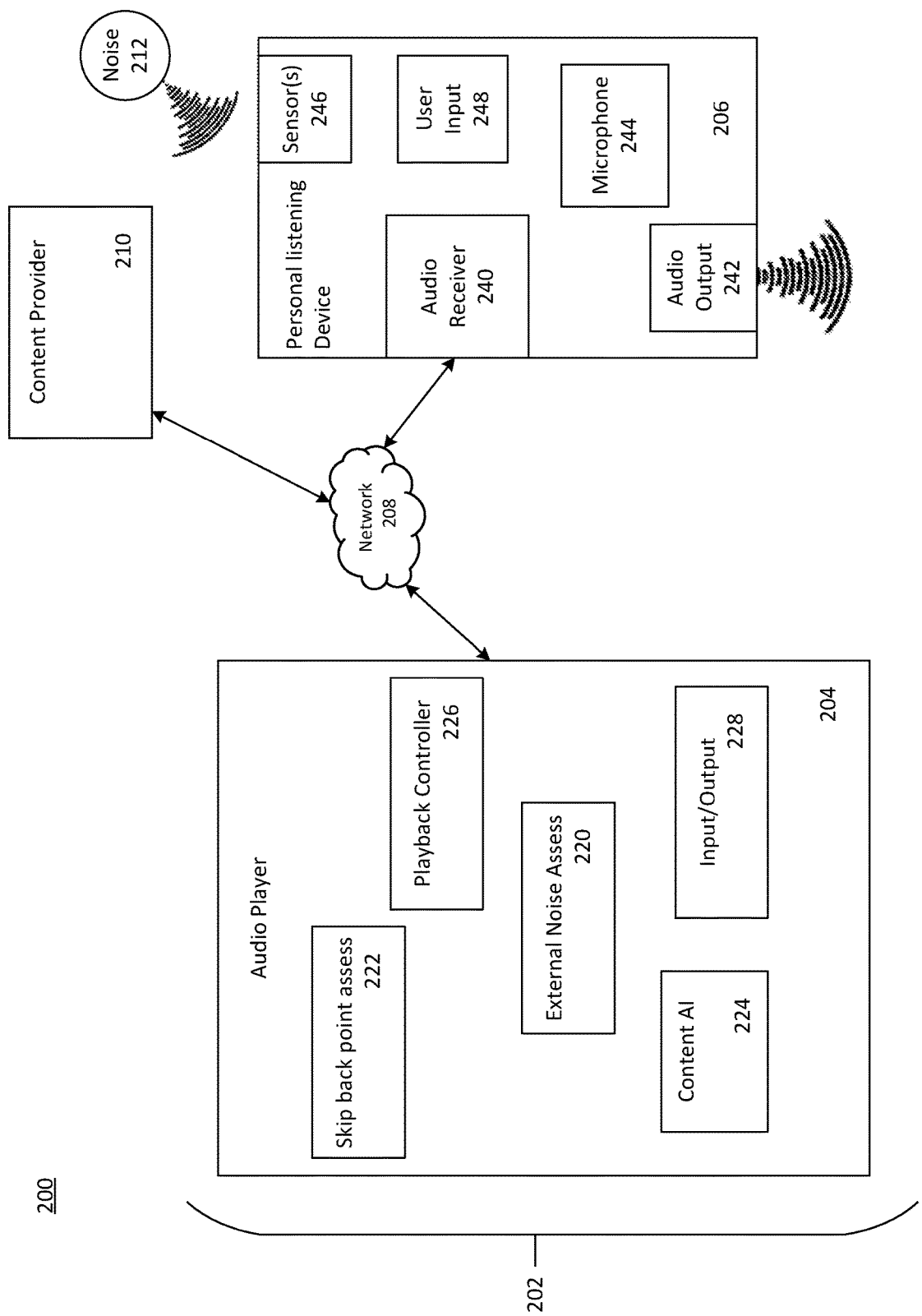
FIG. 2 is a block diagram of an example component environment that includes an audio playback system, in accordance with some implementations.

FIG. 2 is an example block diagram of an environment 200 having the audio playback system 202 and components that enable operation of the audio playback system 202. The audio playback system 202 includes an audio player 204 that communicates with a personal listening device 206 across a network 208. Content provider 210 may provide prerecorded or live audio content to be received by the playback system 202.

The audio player 204 includes an external noise assessment module 220 to determine if a detected interruption is indicative of an interfering noise 212 to trigger the playback mode of the player 204. The noise 212 may be produced by any source of object, person (e.g., talk, scream, etc.), animal, etc. The noise 212 may be a continuous sound or pulses produced as regular short intervals. Noise that is noncontinuous can be treated as an isolated stretch of a same noise for trigger of the playback when the pause between sounds is within a short, e.g. 1-10 seconds between bursts of noise. Such noncontinuous stretch of noise may trigger a single playback to a determined skip back point.

The playback system may also pause audio content output and wait during a pause period of time after a noise is not detected before playing back the audio. An audio interruption may be detected by a microphone and/or sensor(s) of the audio player or the personal listening device 206, or other external devices coupled to the audio player 204 or independent of the audio player 204.

In some implementations, the external noise assessment module 220 may assess visual data in addition to or instead of audio data to determine if an interrupting external noise is imminent or present. Determining whether a noise is interrupting may include measuring a volume of the noise against a threshold volume that triggers the playback mode. In some cases, the volume of the external noise may be compared to the listening volume of the outputted audio content. If the external noise volume is greater than the listening volume by a threshold amount, the playback mode may be triggered.

In some implementations, external noise assessment 220 may include detecting sensor indicators, e.g., visual signals, keywords, natural language speech, etc., that may be interpreted by the playback system as forewarning of an interrupting noise about to occur. Further details and examples of interruption detection and assessment that may be employed by the playback system, are described in U.S. patent application Ser. No. 18/209,382, entitled, Noise Detection For Skip Back Of Audio filed on Jun. 13, 2023 and U.S. patent application Ser. No. 18/209,376, entitled, Responsive Noise Cancelation Override filed on Jun. 13, 2023, the contents of which is incorporated herein by reference.

In some implementations, the playback system may skip back according to a predesignated time (e.g., 1-5 seconds) prior to the interruption. In some circumstances, a predesignated (e.g., determined prior to the listening session) skip back time may be employed, such as when a short portion of the audio content is missed, such as 1-5 seconds. In these cases, the listener may not have significant problems understanding the replayed content.

A skip back assessment module 222 of the audio player 204 may be included to determine a content-based skip back point in the audio content. The skip back point resulting from the skip back assessment module 222 provides a smooth transition for the listener to relisten to the audio content. For example, spoken word content may be difficult for the listener to understand should the content be replayed at random points in the content. The skip back point defines a playback portion of the content after the beginning point and that including the interfered portion and an additional portion of the spoken word content that is previously played during the listening session of the content. In this manner, the playback system does not just rewind to replay the interfered portion, or replay the entire content from the beginning, but instead finds a logical play back place in the content, based on features of the content, prior to the interfered portion and after the beginning of the content being played during the listening session.

In some implementations, speech data may be used by the skip back assessment module 222 to identify various content features indicating possible skip back points in the audio content. The skip back assessment module 222 may receive a transcription of the audio content, or perform transcription and/or identification of content features of the audio content, such as via natural language processing by speech recognition software on running on the audio player. The skip back assessment 222 may determine content features such as character-based features (e.g., transitions between character speech, a pause in speech, voice inflection changes) structure-based features (e.g., points between content sections, phrasing, or section breaks, such as commas, phrases, sentences, paragraphs, chapters, acts, interviews, etc.,), non-breaking section-based features (e.g., connection points between portions of content to block playback commencing at the connection points), topic-based features (e.g., changes of topics in the content, and other characteristics of the content that provide a smooth transition to playback content) and other content features. The skip back point is after the beginning of the content played during a listening session. An example of speech data with content features is described below with regard to FIG. 3.

In some implementations, a content AI model 224 may be employed to predict a natural skip back point in the audio content. The content AI model 224 may be previously trained on the particular audio content, e.g., prerecorded spoken work content. Training of the content AI model 224 is described in detail with regards to FIG. 6 below. The AI model may receive as input the interruption point in the audio content in which the noise had been detected and output the skip back point that is logical for the listener to smoothly transition back to replay the content.

The AI model 224 may further be employed in case of multiple noise interruptions during a listening session to determine a skip back point that avoids the replaying the same content multiple times and/or skipping back too far back in the content.

In some implementations, the AI model may be inputted with characteristics of the listener to determine a logical skip back point for a particular listener. For example, the playback system may access stored information on prior listening sessions of the listener, such as frequency or number of time the audio content or content of similar topics was played. If a listener has consumed the outputted audio content multiple times, the AI model may determine that a shortened skip back point, e.g., immediately prior to the interruption point, may be appropriate, such as 2-5 seconds backward from the interruption point. Other listener characteristics that may be considered as skip back factors may include listener demographics, age, occupation, education, hearing ability, hearing related challenges, listener habits or interests, etc.

In some implementations, content subject factors may also be inputted into the AI model 224 to consider in predicting a skip back point. For example, if the content requires intensive attention from the listener, such as instructional material, the AI model 224 may select a skip back point that is farther back from the interruption point than content that is recreational or less comprehensive, such as a fictional story.

A playback controller 226 controls the output of the audio content, such as according to the skip back points. In some implementations, the playback controller instructs the personal listening device 206 to play, pause, and replay audio via input/output 228.

An input/output 228 to receiving and transmission, such as to/from content provider 210 and personal listening device 206 through network 208. The input/output 228 may also receive user input directly into the audio player.

The personal listening device 206 (also referred to as personal output device) may include an audio receiver 240. The audio content from the audio player 204 may be received by receiver 240 from audio player 204 or directly from content provider 210, and outputted to the listener via audio output 242.

A microphone 244 of the personal listening device 206 may monitor the environment for external noise released from an object 212 that may be in the immediate environment or away from the listener but with sufficient volume to be heard by the listener. Monitoring for external noise may occur at various times, such as continuously when the personal listening device outputs audio content, when particular audio content is outputted, such as spoken word content, at regularly scheduled intervals, upon request of the listener, upon a triggering event, such as visual indicator of interrupting noise as sensed by sensor 246, etc.

In some implementations, a sensor 246 may detect various indications from the environment of the listener that an interrupting noise is occurring or about to occur. In some implementations, the sensor 246 includes one or more cameras coupled to the personal listening device 206. The camera(s) may face particular directions relative to the listener, such as front (same direction as the listener), back, sides, or alternating directions.

Other sensors 246 that may detect information indicative of a current or impending interrupting noise may include ambient light sensor, accelerometer, gps, gyroscope, lidar (e.g., to detect distance from a noise source), magnetometer, proximity sensor (e.g., to detect a distance from a noise source). Some sensors may be employed to triangulate to a noise source and determine whether the source is nearby to the listener. In some implementations, one or more sensors of the audio player may also be employed to detect a noise interruption.

In still some implementations, a user input receiver 248 may be received commands or other input from the listener. For example, a listener may input a manual override play back to cancel the playback mode and continue outputting the content from the point of interruption. User input may be in the form of voice commands, such as "stop skip", natural language commands, or gestures, such as tapping the device. The playback system may be equipped with natural language assessment software to interpret a user voice commands using natural language. In this manner, the playback system may not be restricted to using keyword commands.

Content provider 210 provides audio content that may be in various formats, such as digital prerecorded content, In some implementations, the content provider 210 may provide live audio content, such as a live showing or digital broadcast of a live event. Spoken word content may include various types such as poetry, audio drama, audiobooks, storytelling, non-musical dramas, sermons, narrations with or without music collaboration or accompaniment (where spoken word is the main focus of the content), and instructional recordings, podcasts, interviews, conversational, panel discussions, non-fictional news, stream of consciousness, repurposed content, etc.

Communication may employ any suitable electronic communication for travel across the communication path of network 208. One or more networks 208 may be used for one or two way communication and optionally one or more additional computing resources. The network 208 may connect devices using physical wires, such as cords, and/or also be wireless, such as WiFi, Bluetooth™, near field communication (NFC), etc. In some examples, the network 208 may include one or more cellular networks and/or the Internet, among other networks. In some examples, a local network such as a Bluetooth™ network is employed for communication between the mobile device and television. The network 208 could take other forms as well such as including one or more WANs (Wide-Area Networks) and/or LANs (Local-Area Networks). Typically, the communication path provided by the network 208 is configured for communication over a short distance, such between devices located on a same listener.

Where a wireless network 1208 is employed, the network may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, and other communication protocols.

In some implementations, the audio content may be live produced content, such as a broadcast, that is provided to the audio player and stored as recorded audio by the audio player or other recording device. In such live audio content, the audio player may produce content data on the fly as the audio content is received to assess the data for a skip back point when interrupting noise is identified. In the case of outputting live audio content, the playback system may provide a skip forward feature to return to a live output of the audio content. In some implementations, the playback system may include a skip forward assessment module to determine a natural point in incoming live audio content to skip ahead to output current live audio. For example, after skip back of a commentator describing a currently happening sporting event, the audio playback system may detect a time out in the action and use this natural break in the action to skip forward and catch the listener up with the live event.

Various other configurations of the audio playback system 202 are possible. In some implementations, the audio player 204 may output audio content and/or notifications directly to the listener via speakers or other output components of the audio player 204 without employing the person output device. In such implementations, the components of the personal output deice 206 may be integrated with the audio player 204. In still some implementations, the personal listening device may integrate one or more components of the audio player 204. For example, headphones may include software modules to assess external noise 220, assess a skip back point 222, and/or control playback 226. In some implementations such smart headphones may avoid the need of a separate audio player 204 altogether.

FIG. 3 shows an example of a transcript 300 of spoken word content. The example of audio content shown is an interview that may be prerecorded or live. In FIG. 3, various content features that include skip back points are indicated by a caret (^). Content features that include non-breaking points not available as skip back points are indicated by a caret with a double strikethrough (⩟).

There can be different types of content features identified in audio content to extract a skip back point. For instance, sentence-type content features 302a are identified between sentences spoken by a character 320a, 320b. Change of characters-type content features 302b signifies a switch between character 320a, Person 1 talking and character 320b, Person 2 talking.

Content features may also include a pause in the flow of the audio content, such as a moment of silence, a change of a stream of thoughts, or a transition between types of content. The transition may be, for example, a gap in the content to transition between spoken word and music content. A pause type content feature 302c may be indicated by a gap indicator 308, such as a word, sentence, or phrase that signifies a subsequent or previous pause in the flow of the content. As an example, the gap indicator 308 "Let's pause" signifies a pause-type content feature 302c as a transition between interview content and a reading content.

Some content features indicate non-breaking points in the spoken word content that are unavailable as skip back points. For example, content features may include connector word(s) or phrases that associate sentences of the spoken word content. Connected portions, such as sentences, phrases or thoughts coupled by connectors are non-breaking points, which do not serve as skip back points. For example, a non-breaking point 304 is adjacent to connector word 306a, the word "so" that connects to the previous sentence to the next sentence. Another non-breaking point 304 is adjacent to connector phrase 306b "in order to do that". Whereas a point between sentences may otherwise be identified as a skip back point, the connector word creates a non-breaking point instead.

Other types of content features are possible. In some implementations, content features may be identified by a content AI model, such as a large language model (LLM) trained on prerecorded audio content, as described above with regard to AI model 224 shown in FIG. 2.

Figure 4:
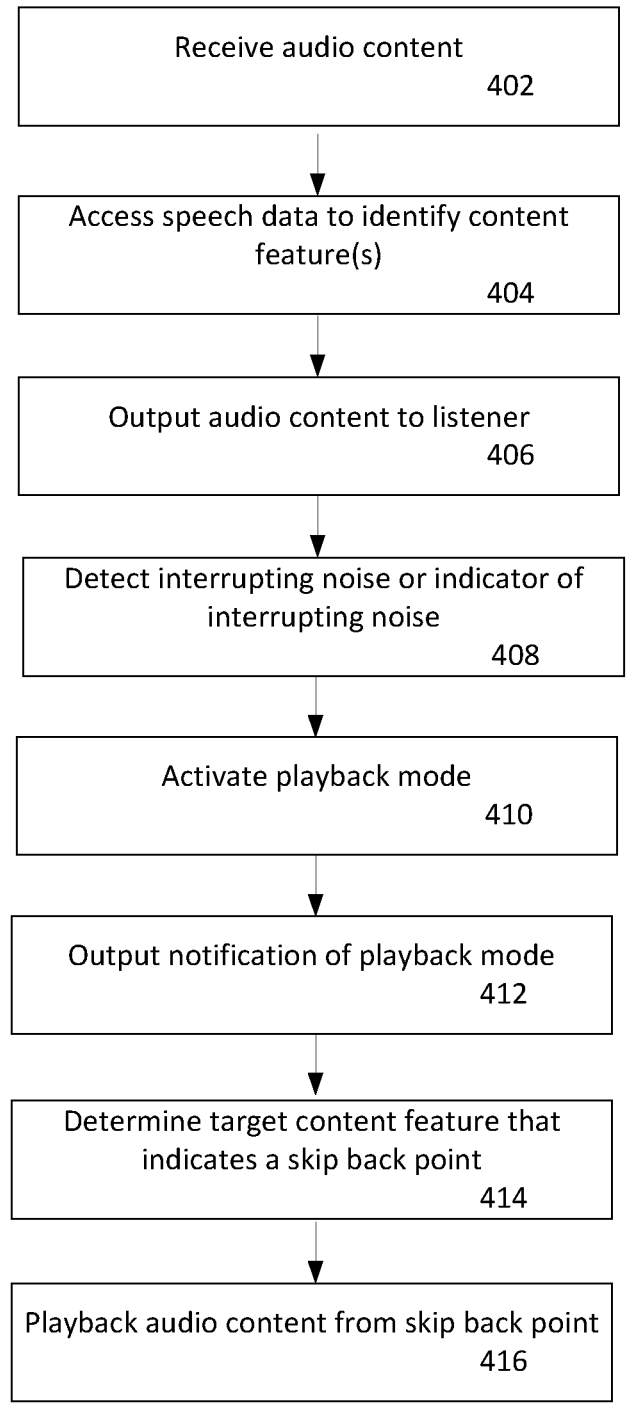
FIG. 4 is a flow diagram of an example method for determining a skip back point to replay audio content, in accordance with some implementations

FIG. 4 is a flow chart of a process 400 for the playback system to determine a skip back point to replay audio content, and may be performed, for example, by the audio player 204 of the playback system 202 shown in FIG. 2.

In block 402, audio content, such as spoken word content is received, for example, via content provider 210 of FIG. 2. In block 404, speech data identifying content features for the received audio content may also be received and/or created. For example, the audio player may receive an electronic written form of the audio content, such as a transcript of a podcast or instructional recording, electronic written version of an audio book being played, a script of an audio drama, and the like. In some implementations, the audio player may analyze the written form to determine various content features to form the speech data. In some implementations, the written form may be analyzed by an external computer and the resulting speech data may be transmitted to the audio player.

In block 406, the audio content received in block 402 is outputted to the listener. In block 408, the playback system may regularly monitor the environment for external noises and/or indicators of imminent external noise about to happen. External noises that may interfere with audio content listening are evaluated, such as volume level, for trigger of a playback mode. Upon detection of an interrupting noise or noise indicator in block 408, the playback mode is activated in block 410.

In some implementations, a notification of the playback mode is outputted to the listener in block 412.

In block 414, a target content feature is identified to indicate a skip back point. The target content feature may be determine based on one or more content feature rules, such as the nearest content feature to the point of interruption in the audio content. The skip back point determined after the beginning of the audio content played during the listening session and prior to the interference point when the external noise is detected. In this manner, rather than simply rewinding the content to a missed portion, the playback portion starts at a natural place in the content and includes a portion of the audio content previously listened to, in addition to the missed portion of the content due to the interfering noise.

In block 416, audio content is played back from the determined skip back point in the audio content.

Figure 5:
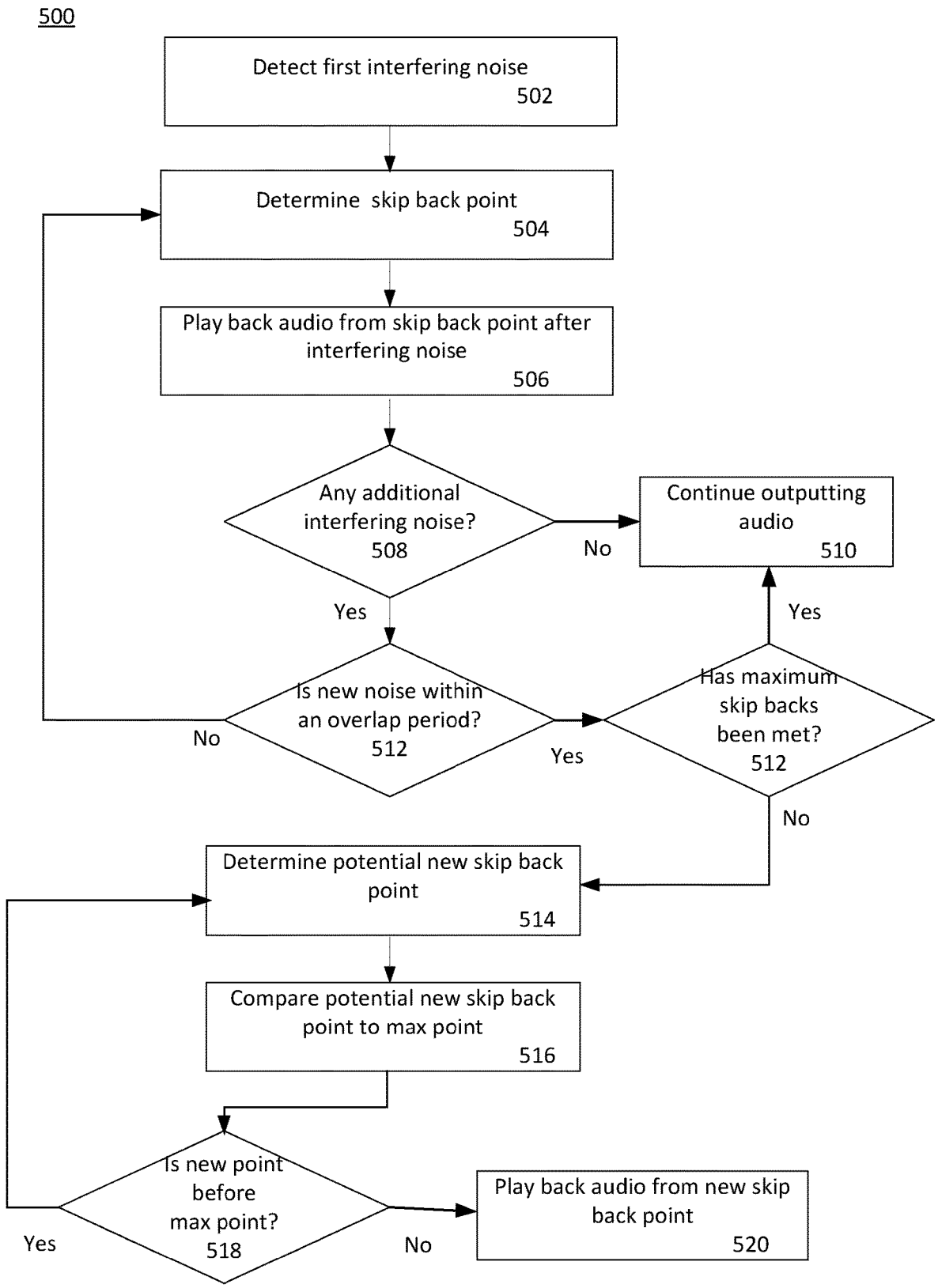
FIG. 5 is a flow diagram of an example method for responding to multiple interferences, in accordance with some implementations.

FIG. 5 is a flow chart of a multiple interference process 500 for the playback system to respond to multiple noise interferences. The process 500 may be performed, for example, by the audio player 204 of the playback system 202 shown in FIG. 2.

In block 502 a first interfering noise is detected. It should be understood that detection of the first interfering noise may include a currently occurring noise or a noise indicator that an external noise is about to occur, such as a person waving down the listener or a visual alarm sensed prior to a presence of an auditory alarm. When the playback mode is triggered by a noise indicator, the audio content may be paused prior to the external noise, avoiding missed portions of the audio content.

In block 504, a skip back point in the audio content may be determined based on content features of the audio content, as described above with regard to FIGS. 2-4. In some implementations, the skip back point may be at a predefined time in the audio from the point of interference in which the audio content is paused, such as skip back between 5-10 seconds.

The playback system continues to monitor the external noise to detect when the external noise ceases for a predefined quiet period of time. For example, if the external noise is intermittent and repeats after a short predefined quiet period, such as 1-2 seconds, the external noise is considered to be still present. While the external noise is considered present, the audio content may be paused. In block 506, the audio content is outputted from the skip back point after the interfering noise ceases for the quiet period of time.

In decision block 508, it is determined whether any additional interfering noises are present after the initial external noise has ceased. If there are no additional noises, the audio content continues to be outputted without interruption in block 510.

If a new external noise is detected in block 508, then in decision block 512 it is determined whether the new noise is detected within an overlap period of the first play back sequence. The overlap period may include the time in which the playback system is replaying previously played audio content in response to the first interfering noise. In some implementations, the overlap period is a predefined time period from the immediately prior time of playback, such as 1-5 seconds after the initial playback commenced. In some implementations, the predefined time period may be the same as the length of the playback portion of the audio content. For example, if the playback portion is 5 seconds of audio, the overlap period may also be 5 seconds into the playback period. The playback system may avoid having the listener to rehear an interfered portion of audio content multiple times due to multiple noise interferences occurring close in time. The audio output may not catch up to the place in which the content was paused where the playback repeats too often.

Where, in decision block 512, the new noise is outside of the overlap period, the new noise may be treated as another first interfering noise and the process returns to block 504 to determine a skip back point.

In cases that the new noise is within the overlap period, it may be determined in decision block 512 whether a maximum number of skip backs have been met during a listening period. For example, the playback system may restrict skip backs to 3-5, such as 3, for a listening period of 1 minute of audio content. If the maximum number of skip backs has been met, the process continues outputting audio content in block 510 without playing back portions of the content.

If the maximum number of skip backs has not been met, the process may move to block 514 to determine a new potential skip back point. The determination of the potential new skip back point may use the same process, such as using content features, as determining the prior skip back point in block 504. The potential new skip back point may be a place in the audio content that differs from the prior skip back point.

In block 516, the potential new skip back point is compared to a maximum point in the audio content in which the system is enabled to skip back, according to one or more maximum point rules. The maximum point designates a farthest skip back point in the audio content and restricts playback beyond the farthest skip back point in response to multiple noise interferences. For example, the initial skip back point for the first interfering noise may be set as the maximum point such that the system may not be permitted to skip back prior to the initial skip back point.

In block 520, the audio is played back from the new skip back point. The maximum point and maximum skip back limitation enable the listener to enjoy the content without consuming too much time replaying the same audio content multiple times.

Figure 6:
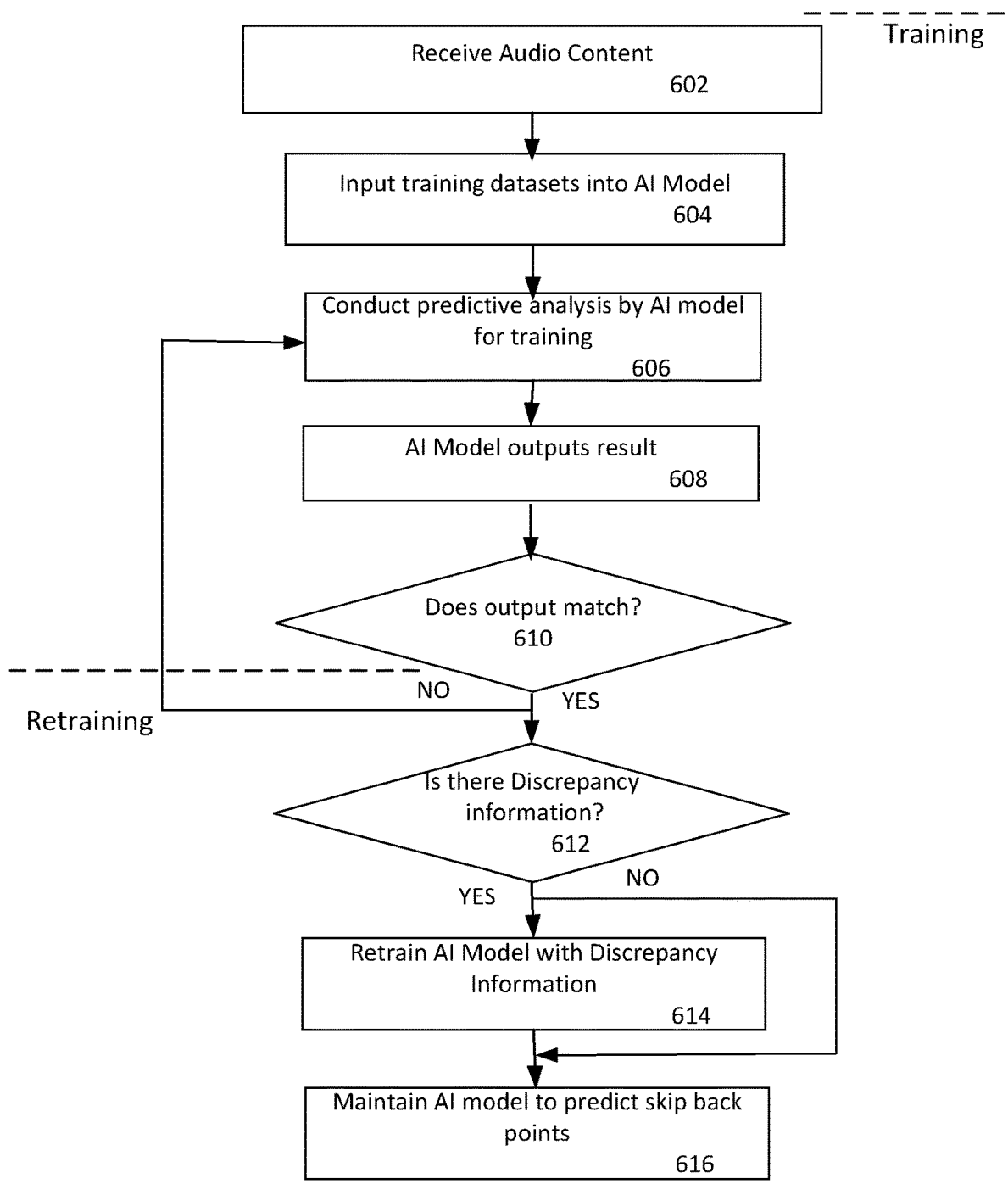
FIG. 6 is a flow diagram of an example method for training a content artificial intelligence (AI) model for use in identifying skip back points, in accordance with some implementations.

FIG. 6 is a flow chart of a process 600 for training a content AI model for use in identifying skip back points. In some implementations, the techniques to train the AI model may employ supervised classification algorithms, such as logistic regression algorithms. In some implementations, unsupervised or semi-supervised techniques may be employed.

In block 602, audio content is received or otherwise accessed for assessment/training purposes. In block 604, training datasets including the audio content is inputted into the AI model. The training datasets may also include characteristics of the content such as genre, subject matter, characters speaking, patterns of speech, etc. In some implementations, for example with listener preauthorization, the training dataset may include listener characteristics, such as age, occupation, interests, level of expertise/experience in the audio content or subject/topic of the audio content, etc.

In block 606, the AI model conducts predictive analysis using the training dataset. The training of the AI model may include determining patterns in previous speech data, similar audio content, listener characteristics, etc., that leads to positive predictive results. Based on the analysis, the AI model outputs a result of the analysis, in block 608.

In decision block 610, the output result is compared with the training dataset inputted into the AI model and predetermined expected output result, to determine whether the output result matches. It is determined whether a threshold of success is achieved by the output result. The threshold of success may specify that some value equal to or less than 100% accuracy (such as 80%-90% success rate) is acceptable output results to be used. In some implementations, the output result may be used to dynamically change and enhance stored skip back points for the audio content.

If it is decided in decision block 610 that the output results match the training datasets to meet the threshold of success, the process continues. If there is a finding that the output results fail to match according to the threshold of success, the AI model is retrained by returning to block 606 and conducting predictive analysis again until the output result matches the training dataset. If a match is not achieved after a threshold number of tries, the analysis algorithm and/or training dataset may be assessed to find a solution to the failures.

In decision block 612, it is determined whether there is discrepancy information from prior AI model output results, in which the output of particular prompts was found to fail a threshold level of success in finding skip back points that create a smooth transition for a listener. Discrepancy information may include feedback from an external support resource, quality control studies, user survey data, etc. The discrepancy information may be used for retraining in block 614. After discrepancy information retraining is complete, the process proceeds to decision block 616 described below.

If no discrepancy information is received, the process skips the discrepancy information retraining and continues to decision block 616 to maintain the AI model for future use in outputting skip back points for the audio content. For example, the AI model may be trained at a computer processing system independent from the audio player. The audio player may receive the AI model associated with the audio content upon receiving the audio content to be outputted to the listener.

Some or all of the training/retraining process 600, or any other processes described herein, or variations and/or combinations of those processes, may be performed under the control of one or more computer systems configured with executable instructions and/or other data, and may be implemented as executable instructions executing collectively on one or more processors. In some implementations, training/retraining process 600 may include additional steps.

The methods of FIGS. 4, 5, and 6 described herein can be performed via software, hardware, and combinations thereof. For example, the process may be carried out in software, such as one or more steps of the process carried out by the playback system. Although the description has been described with respect to particular implementations thereof, these particular implementations are merely illustrative, and not restrictive.

Figure 7:
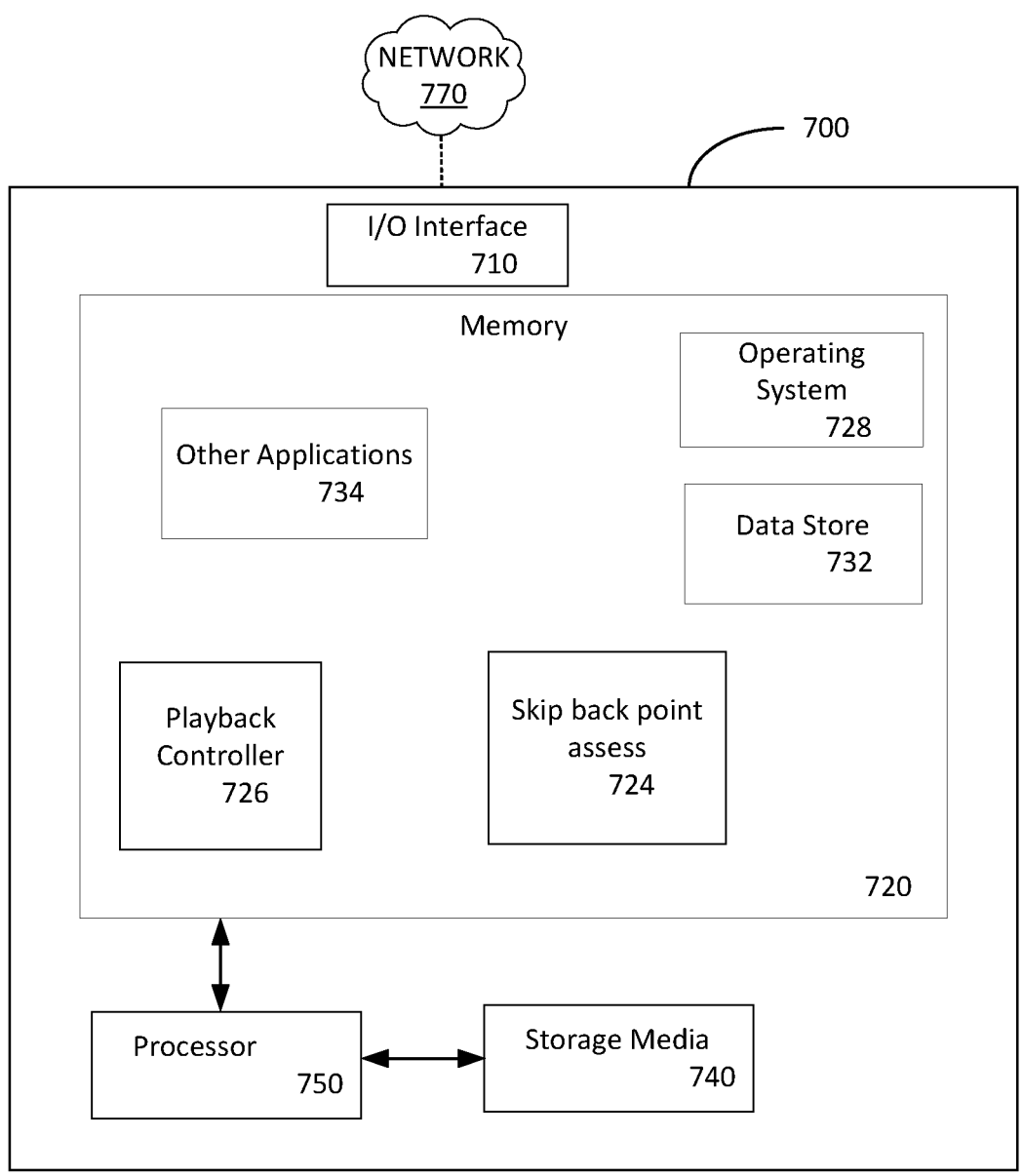
FIG. 7 is a block diagram of components of the playback system usable to implement in the processes of FIGS. 4-5, in accordance with some implementations.

FIG. 7 is a block diagram illustrating an example computer device (also referred to as an apparatus) upon which aspects of the playback system described herein, may be implemented. The computer device 700 represent an audio player, personal listening device, other playback system components, or combinations thereof. Computer device 700 is merely illustrative and not intended to limit the scope of the claims. One of ordinary skill in the art would recognize other variations, modifications, and alternatives.

In one exemplary implementation, computer device 700 includes an I/O interface 710 (which may represent a combination of a variety of communication interfaces) that may include a network interface that receives information and data, such as audio content from a content provider (e.g., 210 in FIG. 2), input from a user, such as commands to pause, playback, skip forward, stop audio commands from the listener, noise related data, such as detection data from a microphone and/or sensor of the personal listening device (e.g., 206 in FIG. 2), and other information/data relevant to the playback system processes. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like.

Computer device 700 may also include software that enables communications of I/O interface 710 over a network 770 such as HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 770 may include a local area network, a wide area network, a wireless network, an Intranet, the Internet, a private network, a public network, a switched network, or any other suitable communication network, such as for example Cloud networks. Network 770 may include many interconnected computer systems and any suitable communication links such as hardwire links, optical links, satellite or other wireless communications links such as BLUETOOTH, WIFI, wave propagation links, or any other suitable mechanisms for communication of information. For example, network 770 may communicate to one or more mobile wireless devices, such as the audio player paired with the personal listening devices (e.g., headphone, earbud, hearing aid, etc.), mobile phones, tablets, and the like, via a wireless transceiver.

Computer device 700 typically includes familiar computer components such as a processor 750, and memory storage devices, such as a memory 720. A bus may interconnect computer components. While a computer is shown, it will be readily apparent to one of ordinary skill in the art that many other hardware and software configurations are suitable for use with the present invention Memory 720 may include solid state memory in the form of NAND flash memory and storage media 740. The computer device may include a microSD card for storage and/or may also interface with cloud storage server(s). In some implementations, computer device 700 is a smart phone or similar portable computing device, having solid state memory. In some implementations, the computing device may be a portable computer having memory 720 as random access memory (RAM).

Memory 720 and storage media 740 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 732 may be employed to store various on-board data.

Computer device 700 includes one or more computer programs, such as software for skip back point assessment 724 (e.g., 222 om FIG. 2) and playback controller 726 (e.g., 226 in FIG. 2) and various other applications 734 to perform operations described herein. Such computer programs, when executed by one or more processors, are operable to perform various tasks of methods including playback of audio content, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 720, storage device or memory on processor 750. A machine readable medium is any computer program product, apparatus or device used to provide machine instructions or data to a programmable processor.

Computer device 700 further includes an operating system 728 to control and manage the hardware and software of the computer device 700. Any operating system 728, e.g., mobile OS, that is supports the audio playback methods may be employed, e.g., IOS, Android, Windows, MacOS, Chrome, Linux, etc.

Although the description of the playback system has been described with respect to particular embodiments thereof, these particular embodiments are merely illustrative, and not restrictive.

Any suitable programming language can be used to implement the routines of particular embodiments including IOS, Objective C, Swift, Java, Cotlin, C, C++, C#, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for responsive playback of spoken word content, the method comprising:
    outputting the spoken word content at a beginning point by an audio player to a listener during a listening session;
    detecting a first interfering noise present while an interfered portion of the spoken word content is outputted;
    determining a first skip back point in the outputted spoken word content prior to the interfered portion, based, at least in part, on:
        analyzing a written form of the outputted spoken word content to identify one or more content features that indicate one or more places in the spoken word content to serve as the first skip back point and/or to avoid as the first skip back point; and
        using the one or more content features, identifying the first skip back point; and
    outputting a first playback portion beginning at the first skip back point and including the interfered portion and an additional portion of the spoken word content that is previously played during the listening session.

2. The method of claim 1, wherein the one or more content features includes switching between one or more characters.

3. The method of claim 1, wherein the spoken word content is recorded content and wherein the first skip back point is determined by a content artificial intelligence (AI) model trained to recognize the one or more content features.

4. The method of claim 1, further comprising:
    pausing outputting of the spoken word content during the listening session while the first interfering noise is present and for a predefined period of time after the noise undetected to determine if the noise includes a noncontinuous stretch of the same noise, prior to playing back the spoken word content.

5. The method of claim 4, further comprising:
    outputting a natural language notification of a playback mode of the audio player prior to outputting the first playback portion.

6. The method of claim 1, further comprising:
    detecting one or more subsequent interfering noises within a particular period after detecting the first interfering noise;
    for each subsequent interfering noise detected:
    determining a potential additional skip back point associated with each of the detected one or more subsequent interfering noises, in a same manner as determining the first skip back point;

comparing locations of each of the potential additional skip back points in the spoken word content to a farthest allowable point in the spoken word content;
upon determining that the potential additional skip back point is prior to the farthest allowable point, outputting the spoken word content from the farthest allowable point; and
upon determining that the potential additional skip back point is after the farthest allowable point, outputting the spoken word content from the potential additional skip back point.

7. The method of claim 1, further comprising:
detecting one or more subsequent interfering noises within a particular period after detecting the first interfering noise;
in response to detecting each of the one or more subsequent interfering noise, determining whether a maximum number of skip back events is met,
determining a potential second skip back point associated with each of the detected one or more subsequent interfering noises, in a same manner as determining the first skip back point in response to determining the maximum number of skip back events is not met.

8. The method of claim 1, wherein identifying the one or more content features that indicate one or more places in the spoken word content to avoid as the first skip back point, includes determining one or more connection points between portions of the spoken word content.

9. An apparatus of an audio playback system responsive playback of spoken word content, the apparatus comprising:
one or more processors; and
logic encoded in one or more non-transitory media for execution by the one or more processors and when executed operable to perform operations comprising:
outputting the spoken word content at a beginning point by an audio player to a listener during a listening session;
detecting a first interfering noise present while an interfered portion of the spoken word content is outputted;
determining a first skip back point in the outputted spoken word content prior to the interfered portion, based, at least in part, on:
analyzing a written form of the outputted spoken word content to identify one or more content features that indicate one or more places in the spoken word content to serve as the first skip back point and/or to avoid as the first skip back point; and
using the one or more content features, identifying the first skip back point; and
outputting a first playback portion beginning at the first skip back point and including the interfered portion and an additional portion of the spoken word content that is previously played during the listening session.

10. The apparatus of claim 9, wherein the spoken word content is recorded content and wherein the first skip back point is determined by a content artificial intelligence (AI) model trained to recognize the one or more content features.

11. The apparatus of claim 9, wherein the operations further comprise:
pausing outputting of the spoken word content during the listening session while the first interfering noise is present and for a predefined period of time after the noise is undetected to determine if the noise includes a noncontinuous stretch of the same noise, prior to playing back the spoken word content; and
outputting a natural language notification of a playback mode of the audio player prior to outputting the first playback portion.

12. The apparatus of claim 9, wherein the operations further comprise:
detecting one or more subsequent interfering noises within a particular period after detecting the first interfering noise;
for each subsequent interfering noise detected:
determining a potential additional skip back point associated with each of the detected one or more subsequent interfering noises, in a same manner as determining the first skip back point;
comparing locations of each of the potential additional skip back points in the spoken word content to a farthest allowable point in the spoken word content;
upon determining that the potential additional skip back point is prior to the farthest allowable point, outputting the spoken word content from the farthest allowable point; and
upon determining that the potential additional skip back point is after the farthest allowable point, outputting the spoken word content from the potential additional skip back point.

13. The apparatus of claim 12, wherein the operations further comprise:
detecting one or more subsequent interfering noises within a particular period after detecting the first interfering noise;
in response to detecting each of the one or more subsequent interfering noise, determining whether a maximum number of skip back events is met,
determining a potential second skip back point associated with each of the detected one or more subsequent interfering noises, in a same manner as determining the first skip back point in response to determining the maximum number of skip back events is not met.

14. The apparatus of claim 9, wherein identifying the one or more content features that indicate one or more places in the spoken word content to avoid as the first skip back point, includes determining one or more connection points between portions of the spoken word content.

15. A non-transitory computer-readable storage medium carrying program instructions thereon for responsive playback of spoken word content, the instructions when executed by one or more processors cause the one or more processors to perform operations comprising:
outputting the spoken word content at a beginning point by an audio player to a listener during a listening session;
detecting a first interfering noise present while an interfered portion of the spoken word content is outputted;
determining a first skip back point in the outputted spoken word content prior to the interfered portion, based, at least in part, on:
analyzing a written form of the outputted spoken word content to identify one or more content features that indicate one or more places in the spoken word content to serve as the first skip back point and/or to avoid as the first skip back point; and
using the one or more content features, identifying the first skip back point; and
outputting a first playback portion beginning at the first skip back point and including the interfered portion and an additional portion of the spoken word content that is previously played during the listening session.

16. The storage medium of claim 15, wherein the spoken word content is recorded content and wherein the first skip back point is determined by a content artificial intelligence (AI) model trained to recognize the one or more content features.

17. The storage medium of claim 15, wherein the operations further comprise:
pausing the output of the spoken word content during the listening session while the first interfering noise is present and for a predefined period of time after the noise is undetected to determine if the noise includes a noncontinuous stretch of the same noise, prior to playing back the spoken word content; and
outputting a natural language notification of a playback mode of the audio player prior to outputting the first playback portion.

18. The storage medium of claim 15, wherein the operations further comprise:
detecting one or more subsequent interfering noises within a particular period after detecting the first interfering noise;
for each subsequent interfering noise detected:
determining a potential additional skip back point associated with each of the detected one or more subsequent interfering noises, in a same manner as determining the first skip back point;
comparing locations of each of the potential additional skip back points in the spoken word content to a farthest allowable point in the spoken word content;
upon determining that the potential additional skip back point is prior to the farthest allowable point, outputting the spoken word content from the farthest allowable point; and
upon determining that the potential additional skip back point is after the farthest allowable point, outputting the spoken word content from the potential additional skip back point.

19. The storage medium of claim 18, wherein the operations further comprise:
detecting one or more subsequent interfering noises within a particular period after detecting the first interfering noise;
in response to detecting each of the one or more subsequent interfering noise, determining whether a maximum number of skip back events is met,
determining a potential second skip back point associated with each of the detected one or more subsequent interfering noises, in a same manner as determining the first skip back point in response to determining the maximum number of skip back events is not met.

20. The storage medium of claim 15, wherein identifying the one or more content features that indicate one or more places in the spoken word content to avoid as the first skip back point, includes determining one or more connection points between portions of the spoken word content.

* * * * *